United States Patent
Carpenter

(10) Patent No.: US 11,247,610 B2
(45) Date of Patent: Feb. 15, 2022

(54) TRAILER EDGE TRACKING

(71) Applicant: Continental Automotive Systems, Inc., Auburn Hills, MI (US)

(72) Inventor: Kyle P Carpenter, Rochester, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 203 days.

(21) Appl. No.: 16/576,474

(22) Filed: Sep. 19, 2019

(65) Prior Publication Data

US 2020/0094743 A1    Mar. 26, 2020

Related U.S. Application Data

(60) Provisional application No. 62/733,683, filed on Sep. 20, 2018.

(51) Int. Cl.
*B60R 1/02* (2006.01)
*B60R 1/072* (2006.01)

(52) U.S. Cl.
CPC .............. *B60R 1/025* (2013.01); *B60R 1/072* (2013.01)

(58) Field of Classification Search
CPC .......... B60R 1/025; B60R 1/072; B60R 1/003
See application file for complete search history.

(56) References Cited

U.S. PATENT DOCUMENTS

| | | |
|---|---|---|
| 5,249,083 A | 9/1993 | Doughtie et al. |
| 5,719,713 A | 2/1998 | Brown |
| 6,151,175 A | 11/2000 | Osha |
| 6,217,177 B1 | 4/2001 | Rost |
| 9,598,015 B1* | 3/2017 | Pertsel ...................... G06T 7/74 |
| 2010/0085652 A1* | 4/2010 | Crouse ................... B60R 1/025 359/843 |
| 2015/0092056 A1* | 4/2015 | Rau ..................... G06K 9/00791 348/148 |
| 2019/0375332 A1* | 12/2019 | Omanovic .............. G06F 3/013 |

FOREIGN PATENT DOCUMENTS

| | | |
|---|---|---|
| DE | 102004037959 A1 | 2/2006 |
| DE | 102010023160 A1 | 12/2011 |
| WO | 2013079068 A1 | 6/2013 |
| WO | WO-2013079068 A1 * | 6/2013 ............. G08G 1/167 |

OTHER PUBLICATIONS

International Search Report and the Written Opinion of the International Searching Authority dated Dec. 13, 2019, for the counterpart PCT Application No. PCT/2019/052073.

* cited by examiner

*Primary Examiner* — James M Pontius
*Assistant Examiner* — Tyler B Edwards

(57) ABSTRACT

A method for adjusting a power mirror supported by a tow vehicle attached to a trailer based on a position of the trailer allowing a driver of the tow vehicle to view an edge of the trailer is provided. The method includes receiving sensor system data from a sensor system positioned on a rear portion of the tow vehicle and receiving a current mirror angle associated with the power mirror. The method includes determining an adjusted mirror angle based on the current mirror angle and the received sensor system data. The method also includes transmitting instructions to the power mirror. The instructions causing the power mirror to adjust the current mirror angle to the adjusted mirror angle resulting in the power mirror maintaining a trailer edge within a field of view of the driver when looking at the power mirror.

16 Claims, 6 Drawing Sheets

TRAILER EDGE TRACKING

CROSS REFERENCE TO RELATED APPLICATIONS

This U.S. patent application claims priority under 35 U.S.C. § 119(e) to U.S. Provisional Application 62/733,683, filed on Sep. 20, 2018, which is hereby incorporated by reference in its entirety.

TECHNICAL FIELD

This disclosure relates to a tow vehicle configured to attach to a trailer. The tow vehicle includes side mirrors that adjust to maintain a view of a trailer edge within the field of view of the driver.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, among others. The tow vehicle may be a car, a crossover, a truck, a van, a sports-utility-vehicle (SUV), a recreational vehicle (RV), or any other vehicle configured to attach to the trailer and pull the trailer. The trailer may be attached to a powered vehicle using a trailer hitch. A receiver hitch mounts on the tow vehicle and connects to the trailer hitch to form a connection. The trailer hitch may be a ball and socket, a fifth wheel and gooseneck, or a trailer jack. Other attachment mechanisms may also be used. In addition to the mechanical connection between the trailer and the powered vehicle, in some example, the trailer is electrically connected to the tow vehicle. As such, the electrical connection allows the trailer to take the feed from the powered vehicle's rear light circuit, allowing the trailer to have taillights, turn signals, and brake lights that are in sync with the powered vehicle's lights.

A driver of the vehicle-trailer system may have a hard time viewing the edge of the trailer in the side power mirrors, especially when making a turn or driving in a rearward direction. In such a case, the driver has to constantly move his/her body to view the trailer within the side power mirrors. Truck mirrors intended for trailer hauling are often bulky in order to increase the range of vision for the driver. SUV mirrors often have a smaller mirror, and aftermarket solutions are hard to find. Therefore, it is desirable to have a system that overcomes the difficulties faced by the driver when trying to find the edge of the trailer within the side power mirror, and to allow the large range of vision while using the smaller mirrors.

SUMMARY

One aspect of the disclosure provides a method for adjusting a power mirror supported by a tow vehicle attached to a trailer based on a position of the trailer allowing a driver of the tow vehicle to view an edge of the trailer. The method includes receiving, at a data processing hardware of a vehicle controller, sensor system data from a sensor system positioned on a rear portion of the tow vehicle. The method includes receiving, at the data processing hardware, a current mirror angle associated with the power mirror. The method includes determining, at the data processing hardware, an adjusted mirror angle based on the current mirror angle and the received sensor system data. The method includes transmitting, from the data processing hardware to the power mirror instructions to adjust the current mirror angle to the adjusted mirror angle causing the power mirror, to maintain a trailer edge within a field of view of the driver when looking at the power mirror.

Implementations of the disclosure may include one or more of the following optional features. In some implementations, the sensor system data includes one or more images received from a camera positioned on the rear portion of the tow vehicle. In some examples, the method includes receiving driver seat position data from a seat module in communication with the data processing hardware. The adjusted mirror angle may also be based on the driver seat position data. The method may also include receiving driver eye location (e.g., sensor data) from one or more sensors positioned to capture the driver eye location. The adjusted mirror angle may also be based on the driver eye location.

In some implementations, the method includes determining an axle length of the trailer that includes a distance between a hitch point between the trailer and the tow vehicle and a trailer axle. The adjusted mirror angle may also be based on the axle length of the trailer. The method may include determining a driver seat distance from the hitch point to a center of a driver seat. The adjusted mirror angle may also be based on the driver seat distance. The method may also include determining a lateral seat distance between a center of the power mirror $C_M$ and a center of a driver seat. The adjusted mirror angle may also be based on the lateral seat distance.

Another aspect of the disclosure provides a system for adjusting a power mirror supported by a tow vehicle attached to a trailer based on a position of the trailer allowing a driver of the tow vehicle to view an edge of the trailer. The system includes data processing hardware and memory hardware in communication with the data processing hardware. The memory hardware stores instructions that when executed on the data processing hardware cause the data processing hardware to perform operations that include the method described above.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
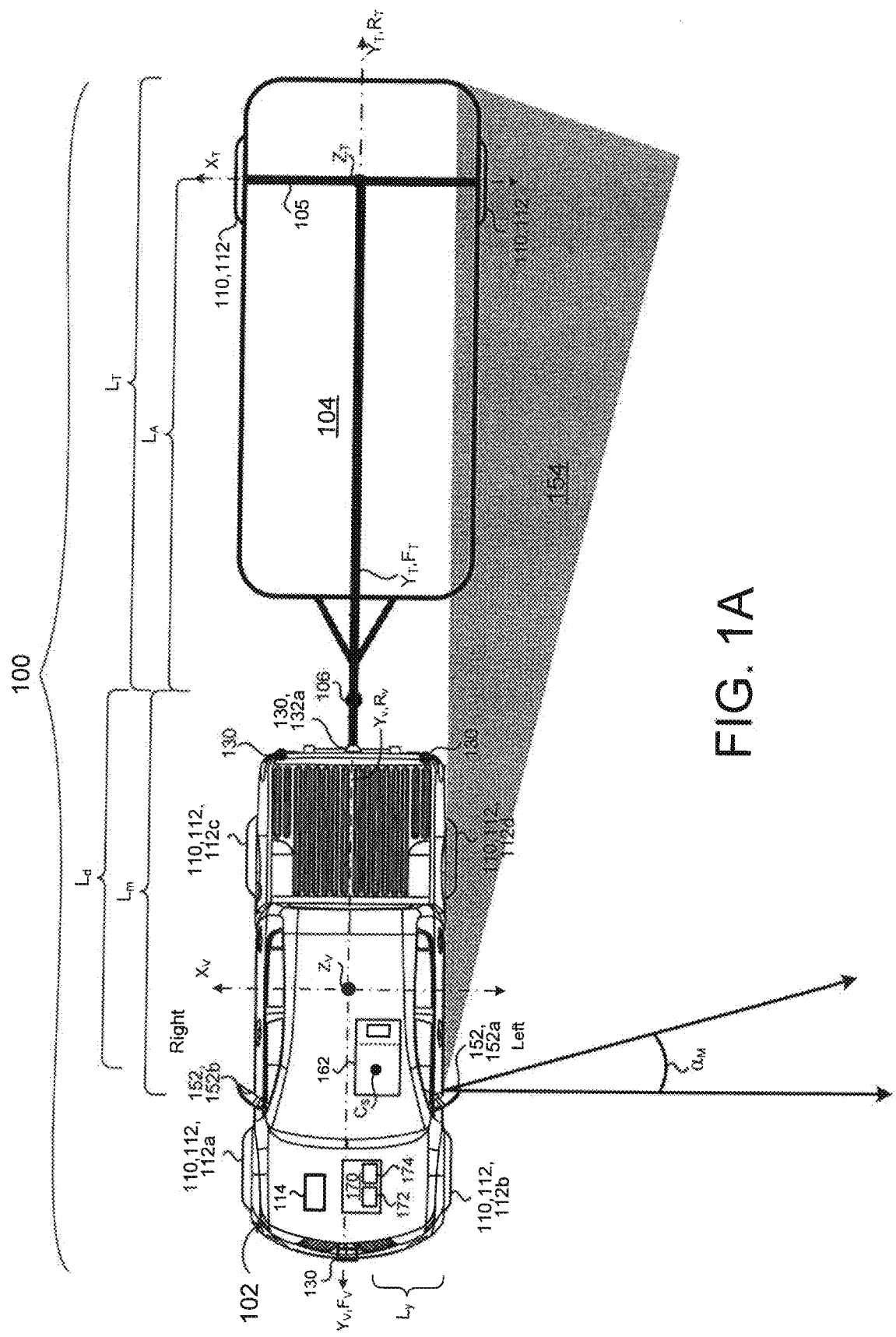
FIGS. 1A-1C are top views of an exemplary tow vehicle hitched to a trailer.

A tow vehicle, such as, but not limited to a car, a crossover, a truck, a van, a sports-utility-vehicle (SUV), and a recreational vehicle (RV) may be configured to tow a trailer. The tow vehicle connects to the trailer by way of a trailer hitch. It is desirable to have a tow vehicle that includes side power mirrors that rotate to maintain an image of the trailer's edge within the field of view of the driver.

Referring to FIGS. 1A-3, in some implementations, a vehicle-trailer system 100 includes a tow vehicle 102 hitched to a trailer 104 by way of a hitch point 106. The tow vehicle 102 includes a drive system 110 associated with the tow vehicle 102 that maneuvers the tow vehicle 102 and thus the vehicle-trailer system 100 across a road surface based on drive maneuvers or commands having X, Y, and Z components, for example. As shown, the drive system 110 includes a front right wheel 112, 112a, a front left wheel 112, 112b, a rear right wheel 112, 112c, and a rear left wheel 112, 112d. In addition, the drive system 110 may include wheels 112 associated with the trailer 104. The drive system 110 may include other wheel configurations as well. The drive system 110 may include a motor or an engine 114 that converts one form of energy into mechanical energy allowing the tow vehicle 102 to move. The drive system 110 includes other components (not shown) that are in communication with and connected to the wheels 112 and engine 114 and that allow the tow vehicle 102 to move, thus moving the trailer 104 as well. The drive system 110 may also include a brake system (not shown) that includes brakes associated with each wheel 112, 112a-d, where each brake is associated with a wheel 112a-d and is configured to slow down or stop the wheels 112a-n from rotating. In some examples, the brake system is connected to one or more brakes supported by the trailer 104. The drive system 110 may also include an acceleration system (not shown) that is configured to adjust a speed of the tow vehicle 102 and thus the vehicle-trailer system 100, and a steering system (not shown) that is configured to adjust a direction of the tow vehicle 102 and thus the vehicle-trailer system 100. The vehicle-trailer system 100 may include other systems as well.

The tow vehicle 102 may move across the road surface by various combinations of movements relative to three mutually perpendicular axes defined by the tow vehicle 102: a transverse axis $X_V$, a fore-aft axis $Y_V$, and a central vertical axis $Z_V$. The transverse axis $X_V$, extends between a right side R and a left side of the tow vehicle 102. A forward drive direction along the fore-aft axis $Y_V$ is designated as $F_V$, also referred to as a forward motion. In addition, an aft or rearward drive direction along the fore-aft direction $Y_V$ is designated as $R_V$, also referred to as rearward motion. In some examples, the tow vehicle 102 includes a suspension system (not shown), which when adjusted causes the tow vehicle 102 to tilt about the $X_V$ axis and or the $Y_V$ axis, or move along the central vertical axis $Z_V$. As the tow vehicle 102 moves, the trailer 104 follows the tow vehicle 102. Therefore, when the tow vehicle 102 makes a turn as it moves in the forward direction $F_V$, then the trailer 104 follows along.

Moreover, the trailer 104 follows the tow vehicle 102 across the road surface by various combinations of movements relative to three mutually perpendicular axes defined by the trailer 104: a trailer transverse axis $X_T$, a trailer fore-aft axis $Y_T$, and a trailer central vertical axis $Z_T$. The trailer transverse axis $X_T$, extends between a right side R and a left side of the trailer 104 along a trailer axle. A forward drive direction along the trailer fore-aft axis $Y_T$ is designated as $F_T$, also referred to as a forward motion. In addition, a trailer aft or rearward drive direction along the fore-aft direction $Y_T$ is designated as $R_T$, also referred to as rearward motion. Therefore, movement of the vehicle-trailer system 100 includes movement of the tow vehicle 102 along its transverse axis $X_V$, fore-aft axis $Y_V$, and central vertical axis $Z_V$, and movement of the trailer 104 along its trailer transverse axis $X_T$, trailer fore-aft axis $Y_T$, and trailer central vertical axis $Z_T$. Therefore, when the tow vehicle 102 makes a turn as it moves in the forward direction $F_V$, then the trailer 104 follows along. When the tow vehicle 102 turns as it moves in the forward F or rearward R direction, the tow vehicle 102 and the trailer 104 form a trailer angle $\alpha_T$ also referred to as articulation angle (FIGS. 1B and 1C) being the angle between the fore-aft axis $Y_V$ of the tow vehicle 102 and the fore-aft axis $Y_T$ of the trailer 104 about the hitch point 106.

In some implementations, the tow vehicle 102 includes a sensor system 130 to provide sensor system data 136 that may be used to determine one or more measurements, such as, a trailer length $L_T$ (for example, trailer length $L_T$ is a distance from the hitch point 106 to the center of rotation $Z_T$ of the trailer 104 where the trailer 104 has two wheels). In some examples, the tow vehicle 102 may be autonomous or semi-autonomous, therefore, the sensor system 130 provides reliable and robust autonomous driving. The sensor system 130 provides sensor system data 136 and may include different types of sensors that may be used separately or with one another to create a perception of the tow vehicle's environment or a portion thereof that is used by the vehicle-trailer system 100 to identify object(s) in its environment and/or in some examples autonomously drive and make intelligent decisions based on objects and obstacles detected by the sensor system 130. In some examples, the sensor system 130 is supported by the rear portion of the tow vehicle 102 and provides sensor system data 136 associated with object(s) and the trailer 104 positioned behind the tow vehicle 102. In other examples, the sensor system 130 includes sensors surrounding the periphery of the tow vehicle 102 and/or the trailer 104. The tow vehicle 102 may support the sensor system 130; while in other examples, the sensor system 130 is supported by the tow vehicle 102 and the trailer 104. The sensor system 130 may include, but not limited to, one or more imaging devices 132, 132a-n (such as camera(s)), and sensors 134, 134a-n such as, but not limited to, radar, sonar, LIDAR (Light Detection and Ranging, which can entail optical remote sensing that measures properties of scattered light to find range and/or other information of a distant target), LADAR (Laser Detection and Ranging), ultrasonic sensor(s), etc. The sensor system 130 provides sensor system data 136 that includes images 133 from the one or more cameras 132, 132a-n and/or sensor data 135 from the one or more sensors 134, 134a-n. Therefore, the sensor system 130 is especially useful for receiving information of the environment or portion of the environment of the vehicle and for increasing safety in the vehicle-trailer system 100 which may operate by the driver or under semi-autonomous or autonomous conditions.

The tow vehicle 102 may include a user interface 140, such as a display. The user interface 140 is configured to display information to the driver. In some examples, the user interface 140 is configured to receive one or more user commands from the driver via one or more input mechanisms or a touch screen display and/or displays one or more notifications to the driver. In some examples, the user interface 140 is a touch screen display. In other examples, the user interface 140 is not a touchscreen and the driver may use an input device, such as, but not limited to, a rotary knob or a mouse to make a selection. In some examples, the driver may interact with the user interface 140 to turn on or off a "mirror tracking" feature that automatically adjusts one or more vehicle power mirrors 152, 152a, 152b to ensures that the trailer edge is centered in the mirror's reflection.

Figure 1B:
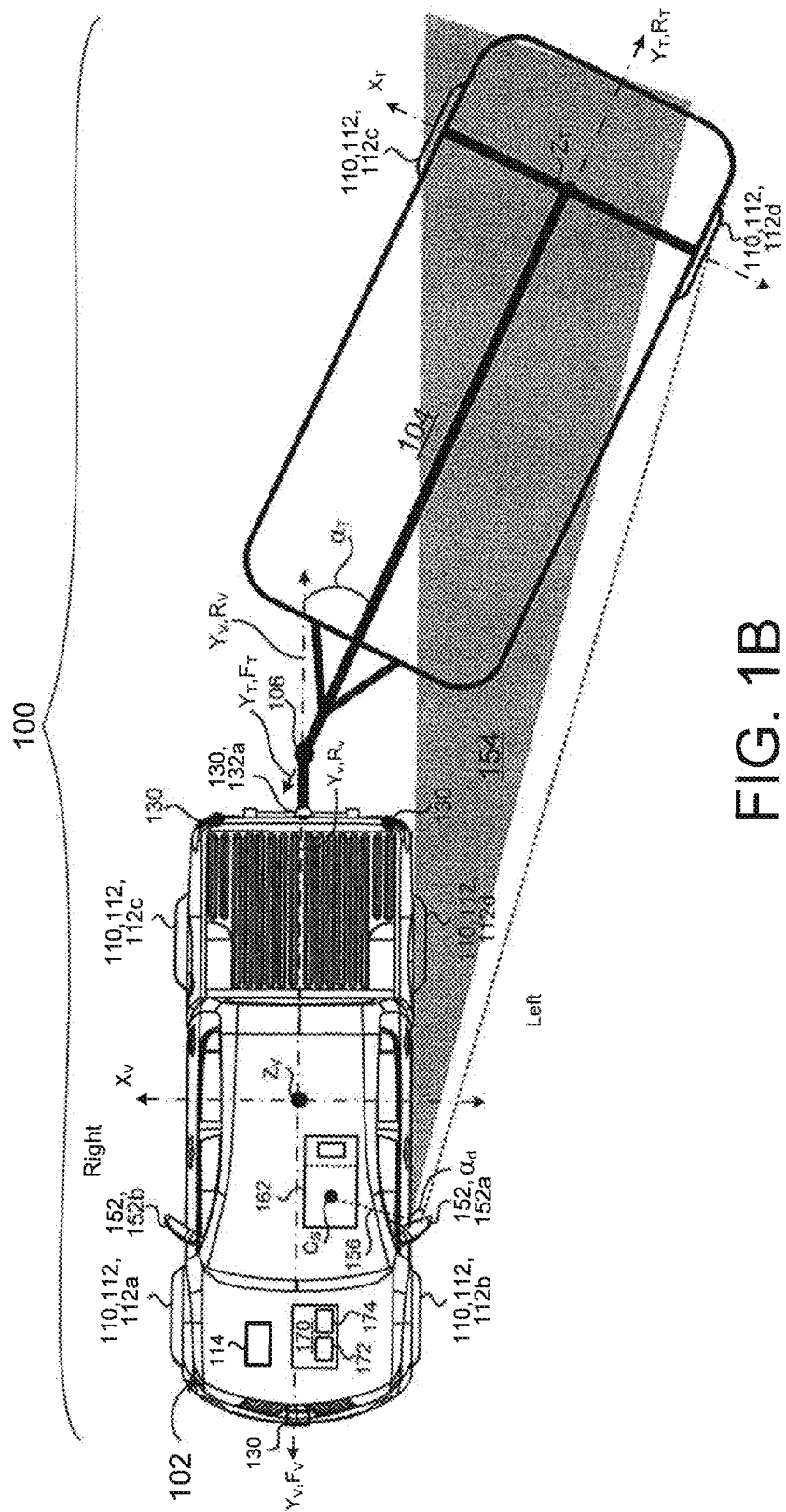

The tow vehicle 102 includes a power mirror system 150 that includes a left-side mirror 152, 152a and a right-side mirror 152, 152b. The mirror system 150 is configured to control a position of the mirrors 152. Referring to FIG. 1A, the power mirrors 152 are set at a given angle providing a field of view 154 associated with the given angle. Therefore, the field of view 154 changes based on the mirror angle/position. When the trailer 104 is aligned in the same direction as the tow vehicle 102 (i.e., zero articulation angle), the side of the trailer 104 is visible as shown in FIG. 1A. Referring to FIG. 1B, when the trailer angle $\alpha_T$ passes the threshold of the field of view 154 of the mirrors 152, the driver will no longer be able to see the edge of the trailer 104. In other words, when the trailer edge is outside the driver field of view 154, then the driver can no longer see the edge of the trailer 104.

Figure 2:
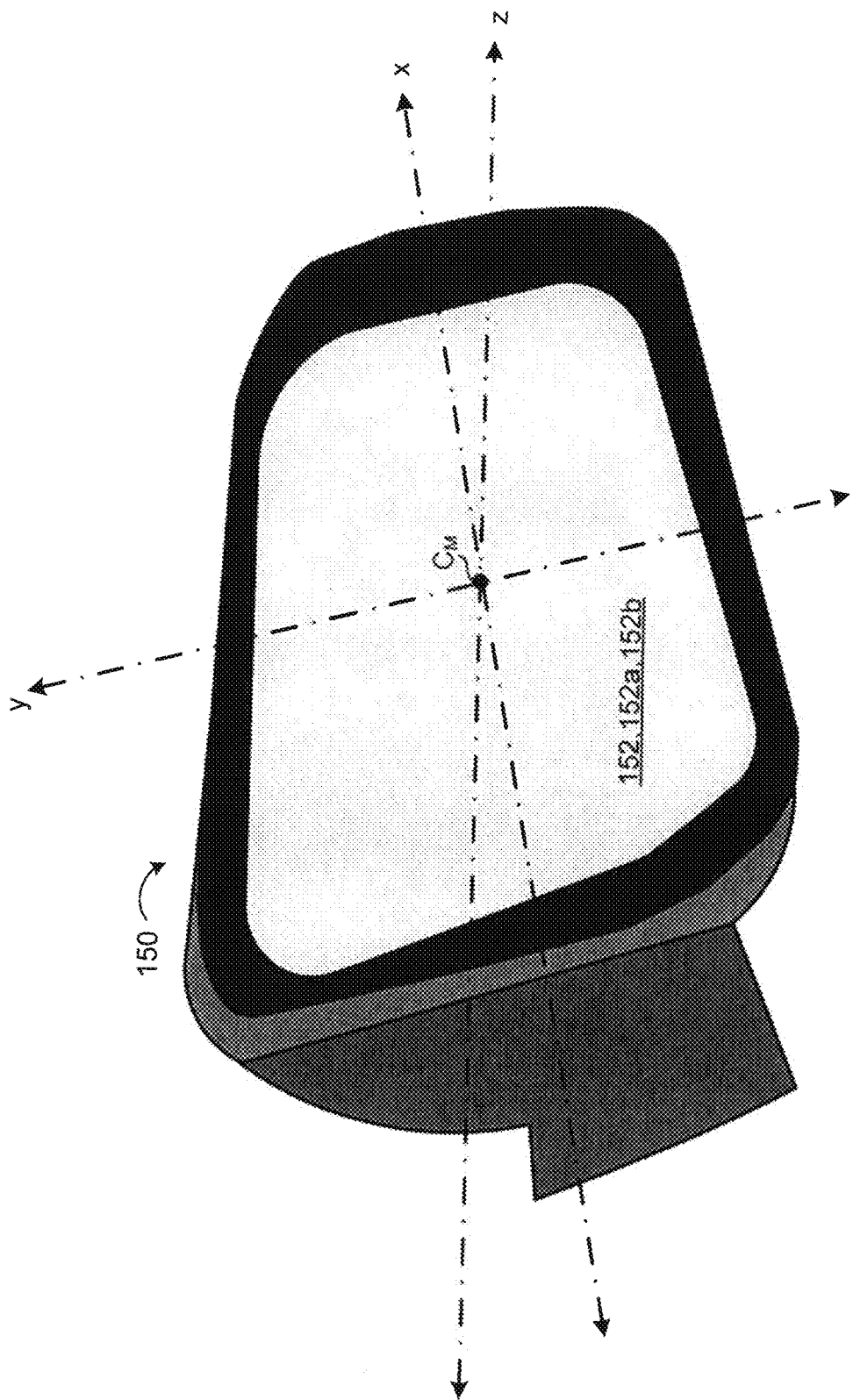
FIG. 2 is a perspective view of an exemplary vehicle power mirror.
Figure 3:
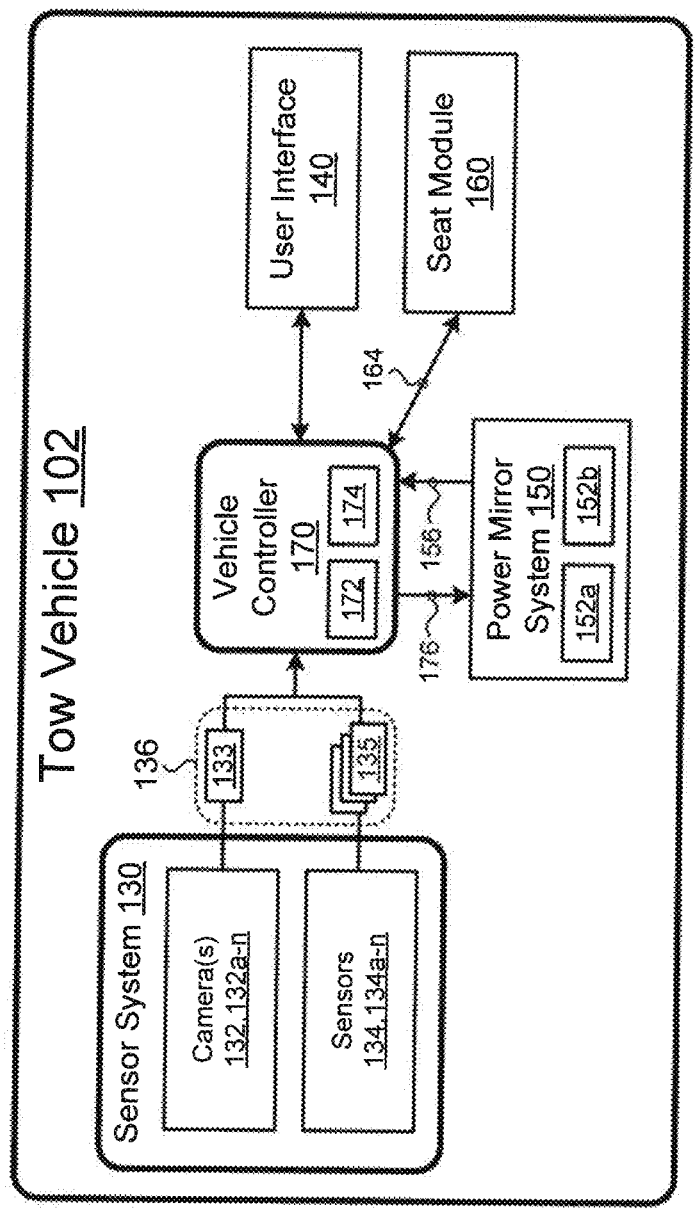
FIG. 3 is a schematic view of an exemplary tow vehicle having.

Referring to FIG. 2, each mirror 152 defines a plane along the x-axis and the y-axis. The x-axis extends between a right edge of the mirror 152, 152a, 152b and a left edge of the mirror 152, 152a, 152b. The y-axis extends between a top edge of the mirror 152, 152a, 152b and a bottom edge of the mirror 152, 152a, 152b. The mirror center $C_M$ is defined by the intersection of the x-axis and the y-axis. The mirror 152, 152a, 152b can tilt about the x-axis and or about the y-axis based on a command from the driver or from a vehicle controller 170. Therefore, an adjustment to the mirror angle $\alpha_M$ allows the driver to see the trailer edge when the trailer edge is outside the driver field of view 154 before the adjustment.

The tow vehicle 102 also includes a seat module 160 that includes the driver seat 162. The seat module 160 is configures to adjust the driver seat 162 based on one or more driver commands. In some examples, the seat module 160 determines a position of the driver seat 162 based on the driver adjustment.

The sensor system 130, the user interface 140, the power mirror system 150, and the seat module 160 are in communication with a vehicle controller 170. The vehicle controller 170 includes a computing device (or data processing hardware) 172 (e.g., central processing unit having one or more computing processors) in communication with non-transitory memory or hardware memory 174 (e.g., a hard disk, flash memory, random-access memory) capable of storing instructions executable on the computing processor(s)). In some example, the non-transitory memory 174 stores instructions that when executed on the computing device 172 cause the vehicle controller 170 to provide a signal or command 176 to the power mirror system 150, which causes the power mirror(s) 152 to adjust its angle. As shown, the vehicle controller 170 is supported by the tow vehicle 102; however, the vehicle controller 170 may be separate from the tow vehicle 102 and in communication with the tow vehicle 102 via a network (not shown).

In some implementations, the vehicle controller 170 receives sensor system data 136 from the sensor system 130, a current mirror angle $\alpha_M$ from the power mirror system 150, and seat position data 164 from the seat module 160 to determine an adjusted mirror angle $\alpha_{MA}$ that ensures that the trailer edge is centered in the reflection of the mirror 152. Based on the received data am, 136, 156, 164, the vehicle controller 170 determines a trailer axle length $L_A$, a trailer length $L_T$, a trailer (or articulation) angle $\alpha_T$, a driver line of sight angle $\alpha_d$, a mirror distance $L_m$, a lateral seat distance $L_y$, and a driver seat distance $L_d$. Once the vehicle controller 170 determines these parameters (i.e., a trailer axle length $L_A$, the trailer length $L_T$, trailer (or articulation) angle $\alpha_T$, driver line of sight angle $\alpha_d$, a mirror distance $L_m$, a lateral seat distance $L_y$, and a driver seat distance $L_d$), then the vehicle controller 170 determines the adjusted current mirror angle $\alpha_{MA}$ based on the parameters and the received data received data 136, 156, 164.

In some implementations, the vehicle controller 170 determines the trailer axle length $L_A$ from the hitch point 106 to the center of rotation $Z_T$ of the trailer 104 based on sensor system data 136 received from the sensor system 130. The vehicle controller 170 determines the trailer length $L_T$ of the trailer 104, which is the distance between the hitch point 106 and the rear end of the trailer 104, based on the axle length $L_A$. The vehicle controller 170 receives sensor system data 136 from the sensors 132, 134 of the sensor system 130 that are positioned on the rear side of the tow vehicle 102 while the vehicle-trailer system 100 is moving. Based on the received sensor system data 136, the vehicle controller 170 determines the trailer angle $\alpha_T$ being the angle between the trailer 104 and the tow vehicle 102 (shown in FIG. 1B).

The vehicle controller 170 also receives current mirror angle $\alpha_M$ from the mirror system 150 indicative of an angle of each mirror 152. The vehicle controller 170 determines the adjusted mirror angle $\alpha_{MA}$ for the mirror 152 based on the trailer axle length $L_A$ and/or the trailer length $L_T$, the trailer (or articulation) angle $\alpha_T$, and the current mirror angle $\alpha_M$. Once the vehicle controller 170 determines the adjusted angle $\alpha_{MA}$ for one or both mirrors 152a, 152b, then the vehicle controller 170 transmits a signal 154 to the mirror system 150 or to each one of the mirrors 152a, 152b to adjust the one or both mirrors 152a, 152b based on the adjusted angle $\alpha_{MA}$ associated with the specific mirror 152a, 152b. In some example, the vehicle controller 170 sends the signal 176 via a CAN/LIN or analog voltages, which causes the power mirrors 152a, 152b to actively rotate to maintain the trailer edge within the field of view 154 of the driver. This allows the driver to watch where he/she is steering the trailer 104 without adding large mirrors and without adjusting his/her body.

In some implementations, the vehicle controller 170 determines the driver line of sight angle $\alpha_d$ between the driver's line of sight 156 to the mirror 152 and the edge of the trailer 104. The driver line of sight 156 to the mirror 152 may be defined as the line segment 156 between the driver's focal point and the mirror center $C_M$. The vehicle controller 170 determines driver line of sight angle $\alpha_d$ by using trigonometry to relate a lateral offset and a longitudinal offset of the driver (i.e., where the driver's eyes are located) and the trailer edge from the mirror 152. In some implementations, the vehicle controller 170 receives sensor system data 136 from one or more sensors 132, 134 positioned to capture data associated with the driver's position, i.e., head position, such that the vehicle controller 170 determines the lateral and longitudinal offsets of the driver, or in other words, the vehicle controller 170 determines the position of the driver's eyes. Once the vehicle controller 170 determines the position of the driver's eyes, then the vehicle controller 170 determines the line of sight angle $\alpha_d$.

In some examples, the vehicle controller 170 also determines a mirror distance $L_m$ from the mirror center $C_M$ to the hitch point 106 based on the known position of the hitch point 106 (or the vehicle tow ball) determined by the camera 132 and the known position of the mirror 152.

The vehicle controller 170 may also determine a driver seat distance $L_d$ from the hitch point 106 to the center $C_S$ of the driver seat 162 based on the driver seat position data 164 and the position of the hitch point 106. The vehicle controller 170 receives the driver seat position data 164 from the seat module 160. The vehicle controller 170 may calculate the driver seat distance $L_d$ based on a difference between a predetermined vehicle length (not shown) that measures the front of the vehicle to the hitch point 106 and the driver seat position. In other examples, the vehicle controller 170 determines a position of the hitch point 106 based on one or more images 133 received from the rear camera 132 and then determines the driver seat distance $L_d$ based on the determined seat position and the determined position of the hitch point 106.

The vehicle controller 170 may also determine a lateral seat distance $L_y$ between the mirror 152 and the center $C_S$ of the driver seat 162. In some examples, the vehicle controller 170 determines the lateral seat distance $L_y$ based on a model of the tow vehicle 102. For example, the vehicle controller 170 may retrieve the lateral seat distance $L_y$ from memory hardware 174.

In some implementations, the vehicle controller 170 determines the of the trailer length $L_T$ based on the fact that most axles 105 of trailers 104 are located at 60% of the trailer's loading area length from the hitch point 106.

In other examples, the vehicle controller 170 received sensor data 136 from a camera 132 or sensor 134 positioned on the side of the tow vehicle 102 and determines the position of the trailer edge based on the received sensor system data 136 when the tow vehicle 102 is at an angle $\alpha_T$ with respect to the trailer 104. In this case, the vehicle controller 170 does not need to determine the trailer length $L_T$ and the trailer angle $\alpha_T$ because the vehicle controller 170 determines the position of the trailer edge.

Figure 1C:
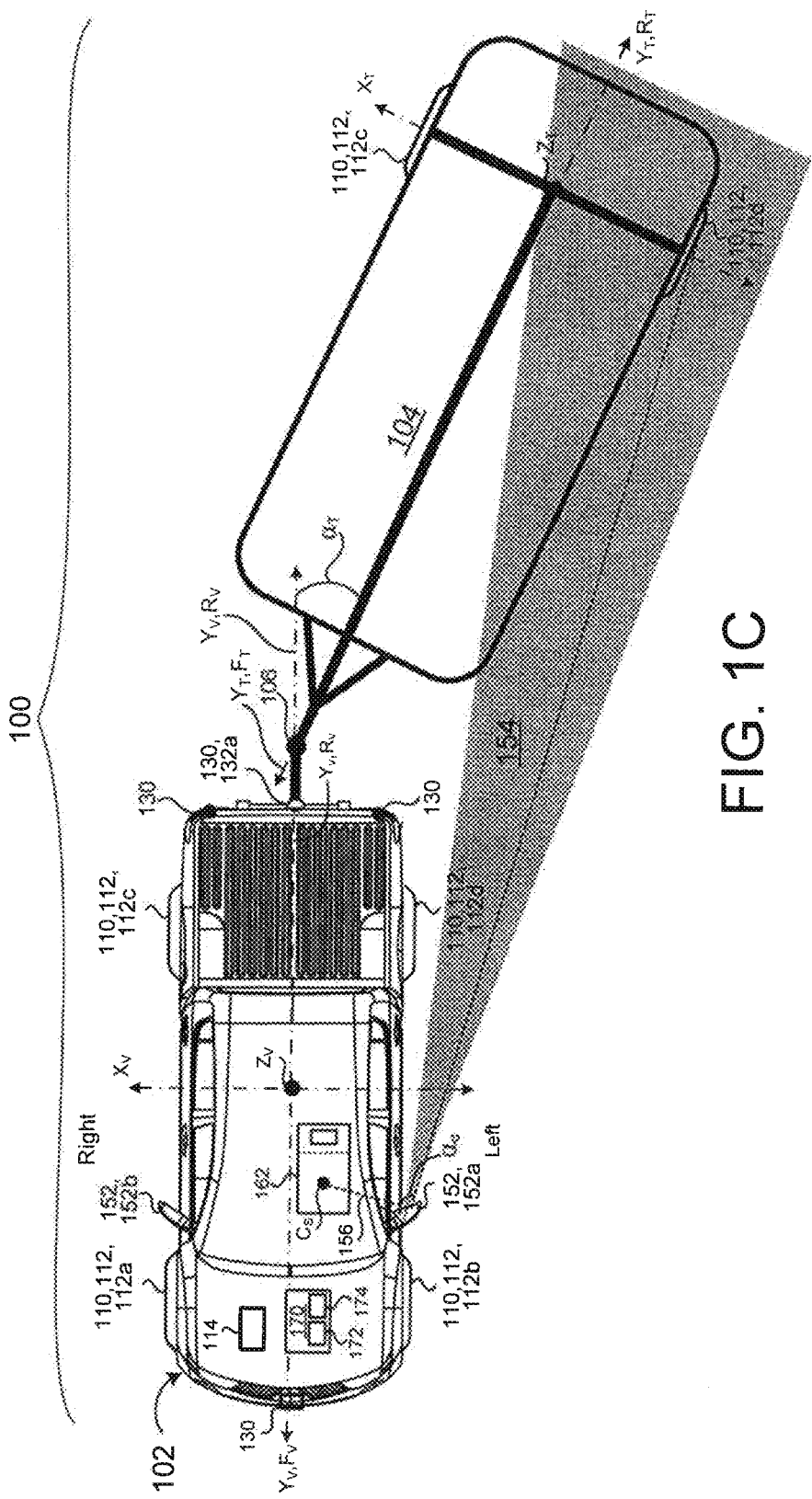

Therefore, the vehicle controller 170 determines an adjusted mirror angle $\alpha_{MA}$ for the mirror 152 to maintain that the field of view angle $\alpha_d$ is constant, ensuring the driver can maintain focus on the edge of the trailer 104 as the trailer angle $\alpha_T$ increases or decreases due to the movement of the tow vehicle 102 with respect to the trailer 104 as shown in FIG. 1C. In other words, the vehicle controller 170 instructs the power mirror system 150 to adjust the right or left mirror 152a, 152b based on the adjusted mirror angle $\alpha_{MA}$ that ensures that the trailer edge is centered in the mirror's reflection.

Figure 4:
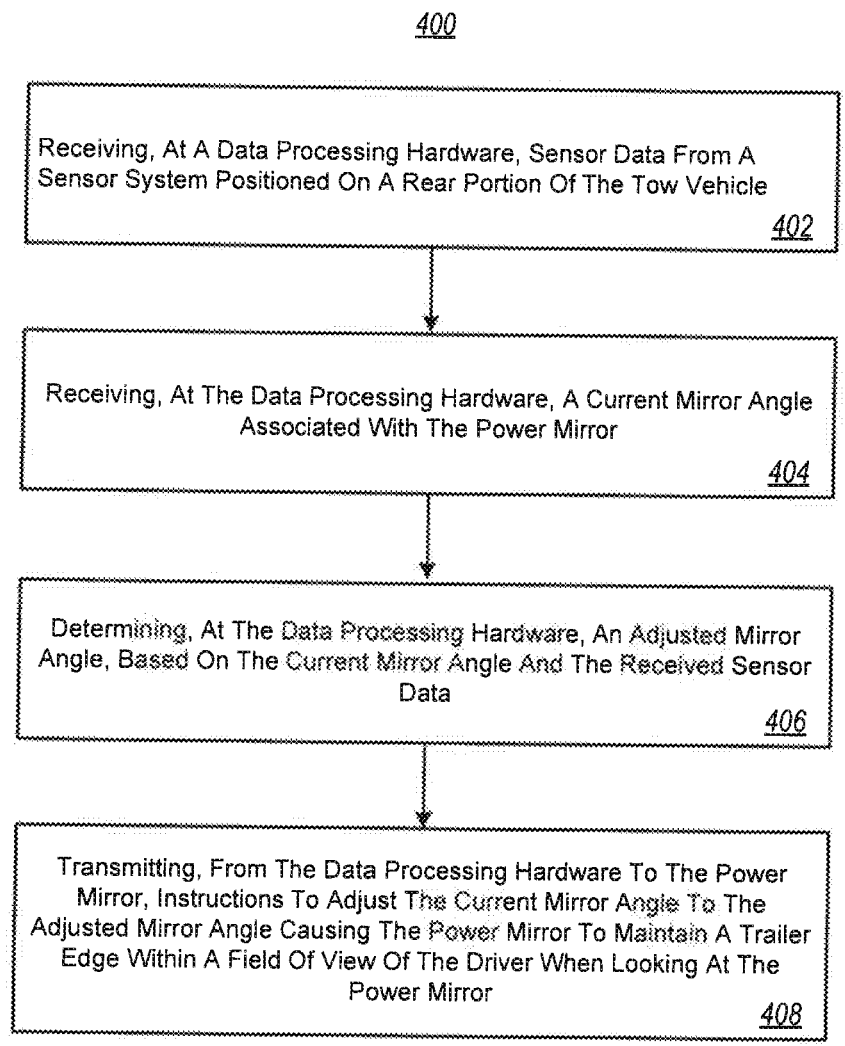
FIG. 4 is a schematic view of an exemplary arrangement of operations for adjusting a vehicle side power mirror of a vehicle attached to a trailer.

FIG. 4 provides an example arrangement of operations of a method 400 for adjusting a power mirror 152, 152a, 152b supported by a tow vehicle 102 attached to a trailer 104 based on a position of the trailer allowing a driver of the tow vehicle 102 to view an edge of the trailer 104, using the system described in FIGS. 1A-3. At block 402, the method 400 includes receiving, at a data processing hardware 172 of a vehicle controller 170, sensor system data 136 from a sensor system 130 positioned on a rear portion of the tow vehicle 102. At block 404, the method 400 includes receiving, at the data processing hardware 172, a current mirror angle $\alpha_M$ associated with the power mirror 152, 152a, 152b. At block 406, the method 400 includes determining, at the data processing hardware 172, an adjusted mirror angle $\alpha_{MA}$ based on the current mirror angle $\alpha_M$ and the received sensor system data 136. At block 408, the method 400 includes transmitting, from the data processing hardware 172 to the power mirror 152, 152a, 152b, instructions to adjust the current mirror angle $\alpha_M$ to the adjusted mirror angle $\alpha_{MA}$ causing the power mirror 152, 152a, 152b, to maintain a trailer edge within a field of view 154 of the driver when looking at the power mirror 152, 152a, 152b.

In some implementations, the sensor system data 136 includes one or more images 133 received from a camera 132 positioned on the rear portion of the tow vehicle 102. In some examples, the method 400 includes receiving driver seat position data 164 from a seat module 160 in communication with the data processing hardware 172. The adjusted mirror angle $\alpha_{MA}$ may also be based on the driver seat position data 164. The method 400 may also include receiving driver eye location (e.g., sensor data 135) from one or more sensors 134 positioned to capture the driver eye location. The adjusted mirror angle $\alpha_{MA}$ may also be based on the driver eye location.

In some implementations, the method 400 includes determining an axle length $L_T$ of the trailer 104 that includes a distance between a hitch point 106 between the trailer 104 and the tow vehicle 102 and a trailer axle 105. The adjusted mirror angle $\alpha_{MA}$ may also be based on the axle length $L_T$ of the trailer 104. The method 400 may include determining a driver seat distance $L_d$ from the hitch point 106 to a center of a driver seat $C_S$. The adjusted mirror angle $\alpha_{MA}$ may also be based on the driver seat distance $L_d$. The method 400 may also include determining a lateral seat distance $L_y$ between a center of the power mirror $C_M$ and a center of a driver seat $C_S$. The adjusted mirror angle $\alpha_{MA}$ may also be based on the lateral seat distance $L_y$.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method for adjusting a power mirror supported by a tow vehicle attached to a trailer based on a position of the trailer allowing a driver of the tow vehicle to view an edge of the trailer, the method comprising:
   receiving, at a data processing hardware, sensor system data from a sensor system positioned on a rear portion of the tow vehicle;
   receiving, at the data processing hardware, a current mirror angle associated with the power mirror;
   determining, at the data processing hardware, an adjusted mirror angle based on the current mirror angle and the received sensor system data;
   transmitting, from the data processing hardware to the power mirror, instructions to adjust the current mirror angle to the adjusted mirror angle causing the power mirror to maintain a trailer edge within a field of view of the driver when looking at the power mirror, and
   determining, at the data processing hardware and based upon the received sensor system data, an axle length of the trailer comprising a distance between a hitch point between the trailer and the tow vehicle and a trailer axle, and calculating, at the data processing hardware, a trailer length based upon the determined axle length, the trailer length comprising a distance between the hitch point and an end of the trailer, wherein the adjusted mirror angle is also based on the calculated trailer length.

2. The method of claim 1, wherein the sensor system data comprises one or more images received from a camera positioned on the rear portion of the tow vehicle.

3. The method of claim 1, further comprising:
   receiving driver seat position data from a seat module in communication with the data processing hardware, wherein the adjusted mirror angle is also based on the driver seat position data.

4. The method of claim 1, further comprising:
   receiving driver eye location from one or more sensors positioned to capture the driver eye location; wherein the adjusted mirror angle is also based on the driver eye location.

5. The method of claim 1, further comprising:
   determining a driver seat distance from a hitch point to a center of a driver seat, wherein the adjusted mirror angle is also based on the driver seat distance.

6. The method of claim 1, further comprising:
   determining a lateral seat distance between a center of the power mirror and a center of a driver seat, wherein the adjusted mirror angle is also based on the lateral seat distance.

7. The method of claim 1, wherein the trailer length is calculated based on the determined axle length of the trailer and a percentage value corresponding to trailer axle placement relative to the trailer length.

8. The method of claim 1, further comprising determining, by the data processing hardware, a line of sight angle between a driver line of sight to the powered mirror and the edge of the trailer, the line of sight comprising a line segment between a driver focal point and a center of the powered mirror, wherein the adjusted mirror angle is also based on the determined line of sight angle.

9. A system for adjusting a power mirror supported by a tow vehicle attached to a trailer based on a position of the trailer allowing a driver of the tow vehicle to view an edge of the trailer, the system comprising:
   data processing hardware; and
   memory hardware in communication with the data processing hardware, the memory hardware storing instructions that when executed on the data processing hardware cause the data processing hardware to perform operations comprising:
      receiving sensor system data from a sensor system positioned on a rear portion of the tow vehicle;
      receiving a current mirror angle associated with the power mirror;
      determining an adjusted mirror angle based on the current mirror angle and the received sensor system data;
      transmitting instructions to the power mirror, the instructions causing the power mirror to adjust the current mirror angle to the adjusted mirror angle causing the power mirror to maintain a trailer edge within a field of view of the driver when looking at the power mirror, and
      determining, based upon the received sensor data, an axle length of the trailer comprising a distance between a hitch point between the trailer and the tow vehicle and a trailer axle, and calculating a trailer length based upon the determined axle length, the trailer length comprising a distance between the hitch point and an end of the trailer, wherein the adjusted mirror angle is also based on the calculated trailer length, wherein the adjusted mirror angle is also based on the calculated trailer length.

10. The system of claim 9, wherein the sensor system data comprises one or more images received from a camera positioned on the rear portion of the tow vehicle.

11. The system of claim 9, wherein the operations further include:
    receiving driver seat position data from a seat module in communication with the data processing hardware, wherein the adjusted mirror angle is also based on the driver seat position data.

12. The system of claim 9, wherein the operations further include:

receiving driver eye location from one or more sensors positioned to capture the driver eye location; wherein the adjusted mirror angle is also based on the driver eye location.

13. The system of claim 9, wherein the operations further include:
determining a driver seat distance from a hitch point to a center of a] driver seat, wherein the adjusted mirror angle is also based on the driver seat distance.

14. The system of claim 9, wherein the operations further include:
determining a lateral seat distance between a center of the power mirror and a center of a driver seat, wherein the adjusted mirror angle is also based on the lateral seat distance.

15. The system of claim 9, wherein the operations further include determining a line of sight angle between a driver line of sight to the powered mirror and the edge of the trailer, the line of sight comprising a line segment between a driver focal point and a center of the powered mirror, wherein the adjusted mirror angle is also based on the determined line of sight angle.

16. The system of claim 9, wherein the trailer length is calculated based on the determined axle length of the trailer and a percentage value corresponding to trailer axle placement relative to the trailer length.

* * * * *